July 29, 1969   C. E. ROSE ETAL   3,458,220
FLUID COUPLINGS
Filed Oct. 7, 1966   3 Sheets-Sheet 1
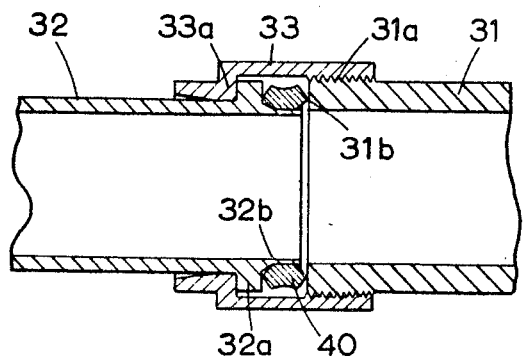
FIG.1.
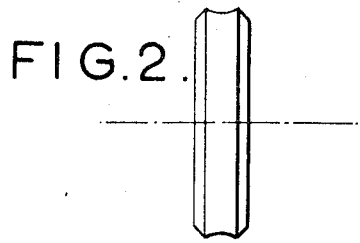
FIG.2.
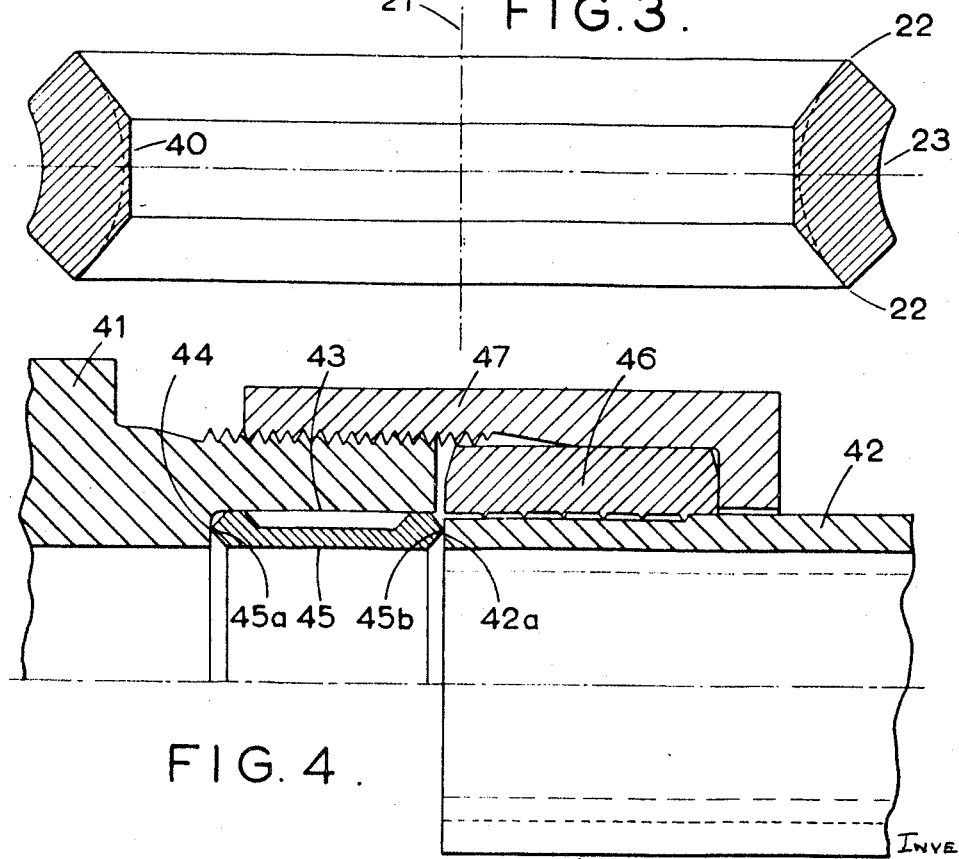
FIG.3.
FIG.4.
INVENTORS
CYRIL ERNEST ROSE
MICHAEL ERIC HANSARD
By Shoemaker and Mattare
ATTYS.

July 29, 1969  C. E. ROSE ETAL  3,458,220
FLUID COUPLINGS
Filed Oct. 7, 1966  3 Sheets-Sheet 3
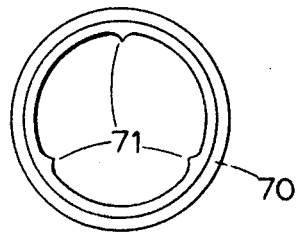
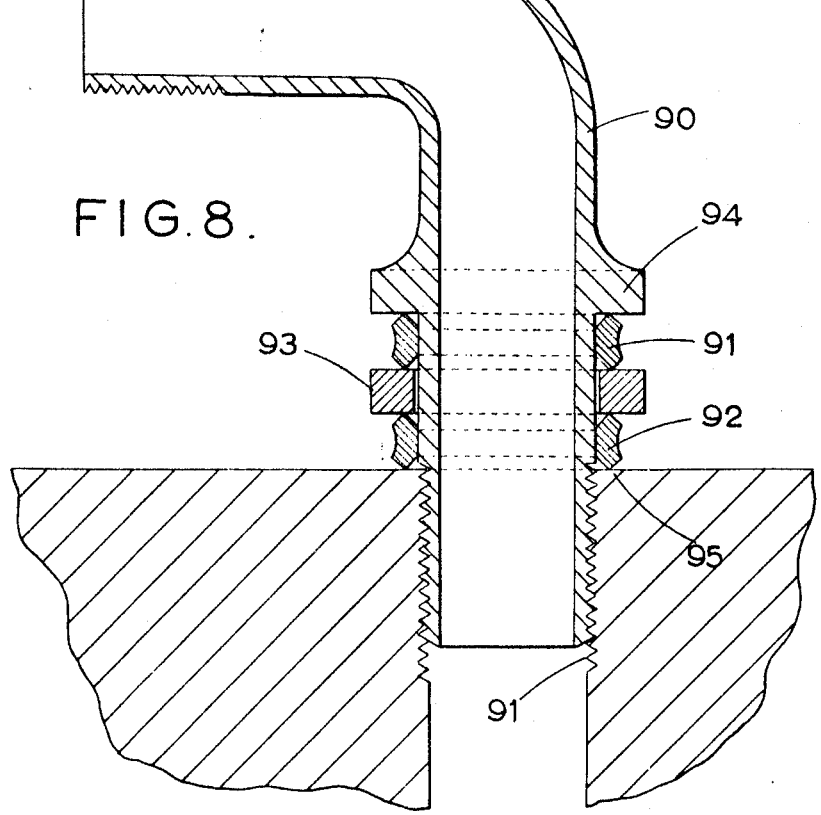
INVENTORS
CYRIL ERNEST ROSE
BY MICHAEL ERIC HANSARD
Shoemaker and Mattare
ATTORNEYS United States Patent Office 3,458,220
Patented July 29, 1969

3,458,220
FLUID COUPLINGS
Cyril Ernest Rose, Wooburn Common, and Michael Eric Hansard, Maidenhead, England, assignors, by mesne assignments, to Clam Seals International Company Limited, Tel-Aviv, Israel, a body corporate of Israel
Filed Oct. 7, 1966, Ser. No. 585,034
Claims priority, application Great Britain, Oct. 13, 1965, 43,389/65; Nov. 8, 1966, 10,158/66
Int. Cl. F16l *5/00, 15/00*
U.S. Cl. 285—220                        2 Claims

ABSTRACT OF THE DISCLOSURE

A pipe coupling including a pair of metallic elements having bores therethrough and annular abutment surfaces. An annular metallic sealing member of material harder than that of the abutment surfaces has sharp peripherally continuous edges at each of its axial extremities which cut into said abutment surfaces. A circumferentially extending recess is formed in the outer periphery of the sealing member, and means is provided for compressing the sealing member between said abutment surfaces to cause the sealing member to be resiliently deformed to maintain a good sealing engagement with said abutment surfaces.

---

This invention relates to sealing members and to pipe connections and other fluid tight couplings incorporating such sealing members. This invention relates to a new and improved sealing member which is adapted to be resiliently deformed in use so that under varying operative conditions it will maintain an effective seal with the members with which it is interengaged.

According to the invention there is provided a fluid tight coupling which includes two metallic elements respectively defining a tubular bore, the bores being substantially aligned in the region of the coupling, including an annular abutment surface formed on each element and extending substantially radially of its bore, said surfaces facing one another and being substantially aligned axially, a hollow metallic sealing member disposed between said elements and providing communication between said bores, said sealing member being of a materail which is harder than the material of the abutment surfaces and consisting of an annulus having a sharp peripherally continuous edge at each of its axial extremities, said sharp edges respectively bearing on said abutment surfaces, and means for urging said abutment surfaces towards one another to cause the sharp edges of the sealing member to score shallow annular grooves in the abutment surfaces with said sealing member being of substantial bow shape in transverse cross-section whereby on being subjected to axial compression between the abutment surfaces, it tends to be resiliently deformed within its elastic limit and subjected to a reduction in its axial length and with said sharp edges being pressed resiliently into sealing engagement with said shallow annular grooves.

The shape of the sealing member provided according to the invention is such that when it is subjected to axial compression from the opposed abutment surfaces bearing against its opposite sharp edges, its moment of inertia about its axis will tend to be reduced with the internal bore of the member tending to be reduced correspondingly.

The shape of the sealing member is such that it is resiliently deformed when subjected to axial pressure applied at its sharp axial extremities and preferably the shape of the sealing member and the material from which it is made are such that the seal can be resiliently deflected to achieve a reduction of at least 0.01% in its axial length with its elastic limit being reached before a reduction in its length of 2% is achieved.

Preferably also the sealing member is made from a material which, in relation to the material of the abutment surfaces between which the sealing member is engaged, is harder in the ratio of at least 1.3:1. In this way it is ensured that the sharp edges at the axial extremities of the sealing member score the opposing abutment surfaces. In order to ensure that the edges score annular grooves in the abutment surfaces the coupling may include means for supporting the seal against substantial movement transversely of its axis and said means may support either the bore or the external periphery of the seal.

The opposing annular abutment surfaces although they extend substantially radially of the bore need not be true planar. Instead they may be conically concave with an included cone angle of up to say 140° or they may be spherically concave to approximately the same degree and effect, always provided that the sharp edges at the axial extremities of the seal can be brought to bear on them with minimal area contact.

In most embodiments the seal has an axial length which is a small fraction of the radius of its bore. It is formed of stainless steel and has a circumferential recess at its outer periphery so that its shape in transverse cross-section is substantially that of a crescent.

However in some pipe connections there may be large temperature differentials which arise in operation internally and externally of the conduit defined by the connection pipes. For example, the fluid in the conduit may be hotter or colder than the region outside the conduit by as much as 500° C. and this temperature differential may arise after the coupling has been made with expansion of the members of the coupling creating a danger that the sharp edges of the seal no longer press into the grooves to maintain a seal. With seals intended to function in conditions such as these the invention provides that the seal is so shaped and is made of such material that it can be resiliently deformed to achieve a reduction of its axial length which is greater than the increase in the distance between the opposing annular abutment surfaces which can arise due to expansion on heating. In order to obtain this characteristic a seal intended for such conditions will have an axial length which is equal to or greater than its bore.

Various embodiments of pipe couplings according to the invention will be described by way of example with reference to the accompanying drawings in which:

FIGURE 1 shows a pipe joint in transverse cross-section, while

FIGURE 2 is a side view to larger scale of the sealing member employed in the coupling shown in FIGURE 1.

FIGURE 3 is transverse cross-sectional view of the sealing member shown in FIGURE 2.

FIGURE 4 is a transverse cross-section view of a pipe joint generally similar to FIGURE 1 but incorporating certain modifications.

FIGURE 7 illustrates in transverse cross-section a further coupling formed between a pipe and a tank or component of an hydraulic system, while FIGURE 8 is a plan view of the sealing member employed in the coupling shown in FIGURE 7.

Figure 5:
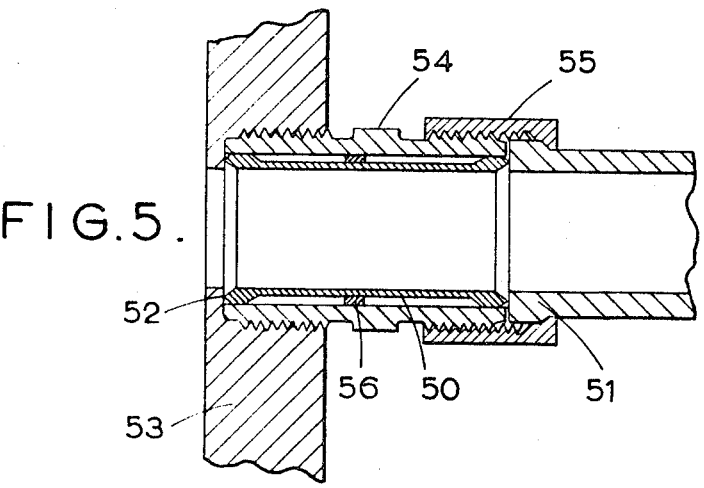
FIGURE 5 shows a coupling between a pipe and the bore of a component which coupling is intended to withstand large temperature differentials externally and internally of the fluid conduit so formed.

Referring first to FIGURES 1, 2 and 3, there is illustrated in FIGURE 1, a joint formed between two pipes 31 and 32. The pipe 31 is threaded at 31a to receive an internally threaded sleeve 33 which has a shoulder 33a which locks behind a projection 32a formed externally on a pipe 32. The pipe 32 has a portion 32b extending forwardly from the projection 32a towards the pipe 31 and around this portion is a sealing member 40 having sharp edges at its opposite axial extremities, as shown more clearly in FIGURES 2 and 3. The sharp edges of the sealing washer 40 abut, on the one hand, against a plane annular surface 31b provided at the end of the pipe 31 and on the other hand against a plane annular surface of the projection 32a.

When the threaded sleeve 33 is tightened it draws pipe 32 towards pipe 31 to apply axial compression on the sealing member 40. The opposite sharp edges (22 in FIGURE 3) of the sealing member will bite into the flat annular surfaces with which these edges abut to score shallow annular grooves. This will be effective to seal the sealing member against the abutting flat annular surfaces. However, as shown in FIGURES 2 and 3, the sealing member 40 is so shaped that when it is subjected to axial compression by members bearing against its sharp edges it is resiliently deformable and tends to be subjected to a reduction in its axial length. In the embodiment illustrated in FIGURE 3 the seal has a depression 23 in its external periphery so that this resilience is achieved by the substantial crescent like shaping of the seal in transverse cross-section and it is of importance in practice that the sleeve 33 is so tightened that the seal is subjected to resilient deformation. Such resilient deformation will result in the sharp edges at the opposite axial extremities of the seal bearing in positively resilient manner in the shallow annular grooves cut by the sharp edges in the annular surfaces of the pipes 31 and 32 against which they abut.

In the embodiment shown in FIGURE 1, the member 32 is provided with the projecting portion 32b which serves approximately to locate the sealing member 40 adjacent the plane annular surface of the projection 32a during pre-assembly of the coupling and prior to tightening the threaded sleeve 33.

An alternative method whereby the sealing member may be located during assembly will be described with reference to FIGURE 4.

In the coupling shown in FIGURE 4 it is required to form a fluid tight connection between a union body 41 and a pipe 42. For this purpose the union body 41 is provided with an enlarged bore portion 43 terminating in a step 44 which constitutes a flat annular surface against which one end of a sealing member 45 is arranged to abut. It will be seen that during assembly of the coupling the sealing member 45 may be located in the enlarged bore portion 43.

The sealing member 45 is of high tensile stainless steel and has at its opposite axial extremities peripherally continuous sharp edges 45a and 45b, these being formed on ribs which project radially outwardly from the generally cylindrical main body portion of the seal 45. It will be seen that the shape of the seal 45 is such that if it is subjected to axial compression directed against the sharp edges 45a and 45b it will tend to be resiliently deformed with both its axial length and its bore tending to be reduced.

The edge 45a bears against the step 44 and the seal 45 having an axial length in excess of the bore portion 43, a flat annular surface 42a formed on the end of the pipe 42 is arranged to bear against the sarp edge 45b.

Means which will be described below, are employed to urge the surface 42a and the step 44 towards one another, whereon on the one hand the seal 45 will tend to be resiliently deformed with its axial length and its bore tending to be reduced and on the other hand the sharp edges 45a and 45b will tend to cut shallow annular grooves in the step 44 and in the face 42a respectively. When the seal 45 is subjected to sufficient pressure to cause it to be resiliently deformed its sharp edges will press resiliently into the shallow grooves and will form a seal therewith. As the sealing is effected between the sharp edges and the grooves cut by the sharp edges, no special surface finishing is required for the surfaces 42a and 44. Moreover, the coupling can be made and remade a number of times without detriment providing the tightening torque is maintained at a sufficient level to cause the sharp edges to bite resiliently into the annular surfaces between which the sealing member 45 is compressed.

As shown for example in FIGURE 1 the means employed for urging the said abutment surfaces towards one another on opposite sides of the seal almost invariably comprise a screw threaded element 33 which is in threaded engagement with one tubular element 31 and is rotatably secured to the second tubular element 32 by being engaged behind an annular abutment shoulder 32a formed thereon. This annular abutment shoulder 32a usually comprises a ring brazed or welded on to the external periphery of the second tube 32. Such a brazing operation is a time consuming task in precision built pipe systems.

In an endeavour to overcome this disadvantage it is proposed in connection with the embodiment shown in FIGURE 4 that the annular abutment should comprise an annular element 46 provided internally with a shallow coarse pitch left-handed thread, and the annular element having externally spanner flats so that it may be screwed into the pipe element 42 with its internal threads cutting a corresponding thread on the outside of the pipe element.

The annular shoulder element 46 has an internal bore whose diameter is substantially equal to the outside diameter of the pipe 42 the latter being a standard gauge pipe as used in high pressure hydraulic systems. These pipes are usually of mild steel and the annular shoulder element 46 will be of harder material so that its internal thread will be able to cut its way on to the pipe 42. A sleeve 47 engages behind the shoulder element 46 and is in threaded engagement of the union body 41 whereby it may be rotated to urge the surface 42a and the step 44 towards one another.

Because of the resilient characteristic of the sealing members 40 or 45 previously described with reference to FIGURES 1 to 4, they will continue to function correctly under varying conditions of temperature and vibration.

However, if for example referring to the embodiment of FIGURE 1 the conduit formed by the pipes were to contain a fluid at low temperature, and a high temperature flame were to be directed externally of the sleeve 33 the latter might be expanded at least in one radial region of the coupling so as to permit the opposed surfaces between which the sealing member 40 is compressed to diverge in this region. In extreme conditions the degree of expansion may be so great that even after the seal in this region has reverted to its normal shape and is no longer resiliently deformed its sharp edges may no longer bear in sealing engagement against the opposed faces of the pipes 31 and 32.

This problem arises because the high temperature acting on the sleeve 33 causes the sleeve to expand more than the seal 40 which is located in a region which is cooled by the fluid in the conduit. The problem is at least partially overcome by making provisions so that the sealing member is heated substantially to the same extent as the sleeve 33, for example by forming the latter with holes in its walls. Another solution is to form the seal 40 of a material which has a higher co-efficient of expansion than the material of the sleeve 33. It will be appreciated that if the fluid in the conduit is very much hotter than the region outside the conduit, the sealing member 40 may expand more than the sleeve 33, and this will be effective to improve the sealing characteristic of the seal.

The embodiment of FIGURE 5 is specifically intended to operate in extreme conditions of temperature differential and it will be seen that the seal 50 shown therein is so shaped that its axial length is considerably greater than its bore diameter. By this measure the seal 50 of FIGURE 5 is resiliently deformed to produce a reduction in its axial length which is greater than the amount of expansion which may be occasioned in the housing members in conditions of high temperature differential.

As shown in FIGURE 5 the seal 50 has its opposite sharp axial extremities bearing on the one hand against the flat annular abutment surfaces of a pipe 51 and on the other hand against the flat annular abutment surface surrounding a bore 52 in a component 53. The sleeve 54 is threaded into the component 53 and surrounds the seal 50. A lock-nut 55 is threaded on the sleeve 54 and serves to clamp the pipe 51 thereto. Assuming the sleeve 54 is one inch in length the seal 50 will have an axial length which is at least 0.010 inch more. When the lock-nut 55 is tightened the seal 50 will be resiliently deflected and the sharp edges at its opposite axial extremities will tend to form shallow annular grooves on the abutting surfaces against which they bear. When the pipe 51 abuts to the end of the sleeve 54, this will determine the maximum degree of resilient deflection to which the seal 50 can be subjected and this will amount to at least 0.2% of its total length.

When extreme differentials of temperature obtain internally and externally of the coupling the components will expand with a consequent increase in the distance separating the end of the pipe 51 from the flat annular abutment surface on the component 53. However, calculations show that this increase will not exceed 0.05% and therefore in these extreme conditions the seal will continue to bear resilinetly with its sharp edges against the annular surfaces of the pipe 51 and component 53.

The seal will be effective even if the relative expansion only takes place in one radial region of the housing components since the seal 50 is able to a limited extent to behave like a bellows with the resilient deflection being greater in one radial region than in the remainder of the sleeve.

In all embodiments the seal will be harder than the material with which its sharp edges abut in a ratio of at least 1.3:1. This will ensure that the sharp edges cut into the abutting surfaces and not vice versa.

In all embodiments great care is taken to ensure that the seal is axially located during tightening operation to ensure that the shallow grooves are accurately formed by the sharp edges. In FIGURE 1, location is provided by the projecting portion 33b internally of the seal while in the case of FIGURE 5 such location is provided externally of the seal by the bore of the sleeve 54.

The particular coupling between a pipe 51 and a component 53 shown in FIGURE 5 has the advantage that sealing is directly between the component and the pipe with the seal 50 providing the sole sealing means there being no necessity to provide additional seals between the sleeve 54 and either the pipe 51 or the component 53.

To facilitate storage and assembly the seal 50 which is a loose sliding fit within the sleeve 54 may be more surely retained therein by means of a spring washer or circlip 56 which is effective to frictionally engage the seal 50 and sleeve 54 so that they may be separated only with deliberation.

Figure 6:
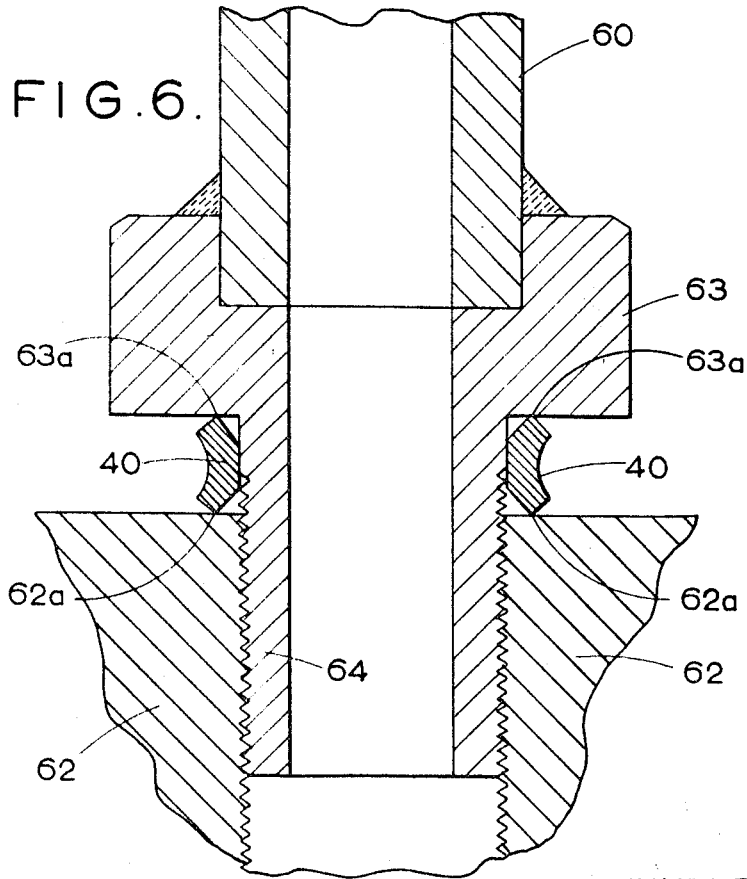
FIGURE 6 illustrates in transverse cross-section a coupling formed between a pipe and the wall of a tank or of a component of an hydraulic system.

Referring now to FIGURE 6 where there is shown a simple connection made between a tubular element 60 and a threaded socket 61 formed in a member 62. The member 62 may be any component having a socket. For example it may be the wall or housing of a tank or reservoir or of a component such as a valve or other device found in a fluid system.

The tubular element 60 has brazed to its end a union member 63 which has a spigot portion 64 threaded in the socket 61. A sealing member 40, of the kind illustrated in FIGURES 2 and 3 is arranged on the spigot portion by and on the union member 63 being screwed down in to the socket 61, one of the sharp edges of the sealing member bites into a flat surface 63a provided on the union member, while the other sharp edge bites into a flat surface 62a of the member 62 surrounding the mouth of the socket 61.

In FIGURE 7 there is shown a sealing member 70 which is identical with the sealing member 40 except that it is formed with a series of projections 71 extending inwardly of its bore.

If the member 70 of FIGURE 7 were substituted for the member 40 of FIGURE 6, when the union member 63 is tightened down sufficiently to cause resilient deformation of the sealing member with a consequent reduction in the bore of the latter, the projections 7, will be brought into engagement with the portion 64 about which it is arranged. It will be seen therefore that the washer 70 of FIGURE 7 may serve a locking function in addition to its normal sealing function.

Referring now to FIGURE 8, this shows one embodiment of pipe joint according to the invention applied to a 90° elbow union. It will be appreciated that for many reasons it is desirable to eliminate 90° pipe unions of the kind commonly known as banjo unions. It is very desirable to use a plain 90° elbow in place of a banjo but certain difficulties exist. The principal difficulty is that if the elbow is screwed down into the component on to a positive stop such as a conventional plain sealing washer, the arm of the elbow to which the pipe is attached will in all probability not be facing in the desired direction. Trial assemblies using shims to correct the direction is tedious and unacceptable. In certain cases taper threads have been used since with these, seals can be maintained over a wide angular movement. Taper threads, however, are expensive to manufacture and are not acceptable in some industries.

The 90° elbow union provided according to this embodiment of the invention is intended to overcome these defects.

As shown in FIGURE 8, the assembly comprises a parallel threaded elbow pipe 90 which is threaded into a socket 97, and is provided with two sealing members 91 and 92 each of the kind illustrated in FIGURES 2 and 3. Disposed between the sealing members 91 and 92 is a plain washer 93 of a softer material than the sealing members material. The sealing member 91 is thus disposed between the plain washer 93 and a shoulder 94 formed on the elbow pipe 90. While the sealing member 92 is disposed between the soft washer 93 and a flat annular surface 95 provided on the component adjacent the mouth of the socket 97. When the elbow pipe 90 is screwed into the component socket 97 the two seals 91 and 92 as well as the plain washer 93 will be subjected to axial compression. The seals 91 and 92 will score shallow annular grooves with their sharp edges in the flat annular surfaces against which they abut. Furthermore, if the axial compression is of a sufficient degree both the washers 91 and 92 will tend to be resiliently deformed. The depth of the grooves cut by the sharp extremities of the sealing washers into the abutting flat annular faces will be dependent on the number of threads per inch and on the number of turns of the thread. If the four grooves were of the same depth and the thread was 16 threads per inch the groove depth per turn would be .0155". Tests have shown that this depth of groove gives a seal and that grooves of greater or less depth also give a seal. The device will therefore seal through a range of angles which may be determined by experience but which are sufficient to allow the elbow to be rotated so that its arm is disposed in the desired direction.

In practice, the grooves in the soft washer 13 will be deeper than those in the component and to remake the joint to a different angle it will only be necessary to replace the soft washer and retighten to the desired position.

The seals shown in FIGURE 3, FIGURE 4 and FIGURE 5 respectively have different cross-sectional profiles. However, they have in common, the sharp peripherally continuous edges at their opposite axial extremities and a cross-sectional shape which is substantially that of a bow and is such that when they are subjected to axial pressure applied at the sharp edges they tend to deform in such manner that their axial length and their bores are reduced. Such deformation is of a resilient nature because of the material of which the seal is constituted. Because they are made sharp the edges at the opposite axial extremities of the seal will cut shallow annular grooves in the two surfaces between which the seal is arranged to be subjected to axial pressure. If this pressure is high the seal will be subjected to resilient deformation as described above and the sharp edges will bear resiliently in the shallow annular grooves they have scored. This has proved in practice to provide sealing between components at very high fluid pressures in excess of 50,000 pounds per square inch, with ultra low leakage rates and under a very wide range of temperature conditions. The seal is especially suitable when the connection in which it is employed is subjected to severe vibration. Also when used for example in the manner shown in FIGURE 6 a part of the function of the seal is akin to that of a spring washer.

We claim:

1. A fluid tight coupling which includes two metallic elements respectively defining a tubular bore, the bores being substantially alinged in the region of the coupling, including an annular flat abutment surface formed on each element and extending substantially radially of its bore, said flat surfaces facing one another and being substantially aligned axially, one element having a cylindrical sleeve adjacent its abutment, a hollow metallic sealing member disposed between said elements, said sealing member being of a material which is harder than the material of the abutment surfaces and consisting of an annulus having an inner cylindrical surface in annular abutting contact with said cylindrical sleeve, said annulus also having a sharp peripherally continuous edge at each of its axial extremities and defining an internal bore, said sharp edges respectively bearing on said respective abutment surfaces, and means for urging said abutment surfaces towards one another to cause the sharp edges of the sealing member to score shallow annular grooves in the abutment surfaces with said sealing member having a circumferentially extending recess formed in its outer periphery so as to be of substantial bow shape in transverse cross-section whereby on being subjected to axial compression between the abutment surfaces it tends to be resiliently deformed within its elastic limit and subjected to a reduction in its axial length and with said sharp edges being pressed resiliently into sealing engagement with said shallow annular grooves, and further wherein when said sealing member is subjected to axial compression from the opposed abutment surfaces bearing against its opposite sharp edges, its moment of inertia about the axis will tend to be reduced with the internal bore of the member tending to be reduced correspondingly, thereby increasing the abutting contact of said inner cylindrical surface against said cylindrical sleeve.

2. A fluid tight coupling which includes two metallic elements respectively defining a tubular bore, the bores being substantially aligned in the region of the coupling, including an annular abutment surface formed on each element and extending substantially radially of its bore, said surfaces facing one another and being substantially aligned axially, a hollow metallic sealing member disposed between said elements, said sealing member being of a material which is harder than the material of the abutment surfaces and consisting of an annulus having a sharp peripherally continuous edge at each of its axial extremities and defining an internal bore, said sharp edges respectively bearing on said respective abutment surfaces, and means for urging said abutment surfaces towards one another to cause the sharp edges of the sealing member to score shallow annular grooves in the abutment surfaces with said sealing member having a circumferentially extending recess formed in its outer periphery so as to be of substantial bow shape in transverse cross-section whereby on being subjected to axial compression between the abutment surfaces it tends to be resiliently deformed within its elastic limit and subjected to a reduction in its axial length and with said sharp edges being pressed resiliently into sealing engagement with said shallow annular grooves, and further wherein when said sealing member is subjected to axial compression from the opposed abutment surfaces bearing against its opposite sharpe edges, its moment of inertia about the axis will tend to be reduced with the internal bore of the member tending to be reduced correspondingly, said sealing member having an elongate cylindrical body portion having an axial length at least equal to one third of the over-all diameter of the seal, the cylindrical portion having at its opposite ends beads which project radially outwardly from said cylindrical portion with said beads being shaped to form the sharp peripherally continuous edges at the opposite axial extremities of the seal, and wherein the diameter of the annulus formed by the sharp edges is at least as great as the mean external diameter of said cylindrical portion, and one of the metallic elements is provided with means for approximately locating the sealing member adjacent the annular abutment surface of the element, prior to tightening of the coupling.

References Cited

UNITED STATES PATENTS

| | | | |
|---|---|---|---|
| 2,413,308 | 12/1946 | Arnold | 285—95 |
| 3,217,922 | 11/1965 | Glasgow. | |
| 3,274,326 | 10/1966 | Morris et al. | 277—236 X |

FOREIGN PATENTS

| | | |
|---|---|---|
| 727,075 | 3/1932 | France. |
| 819,340 | 10/1951 | Germany. |
| 883,992 | 7/1953 | Germany. |
| 360,587 | 11/1931 | Great Britain. |

THOMAS F. CALLAGHAN, Primary Examiner

U.S. Cl. X.R.

277—206, 236; 285—40, 336, 354